Dec. 18, 1945. H. M. MARTIN 2,391,024
DYNAMOMETER
Filed May 27, 1944
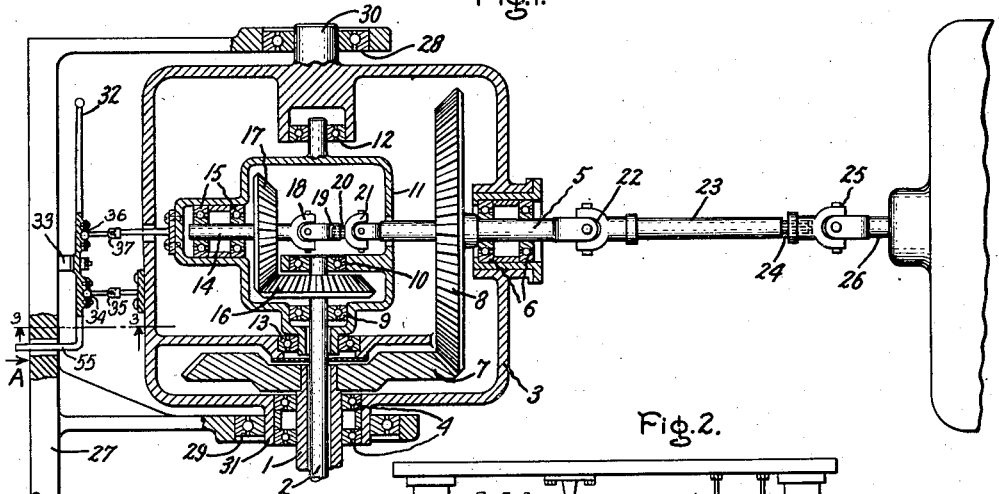
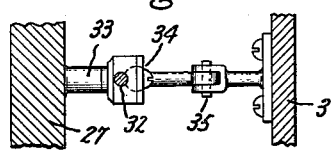
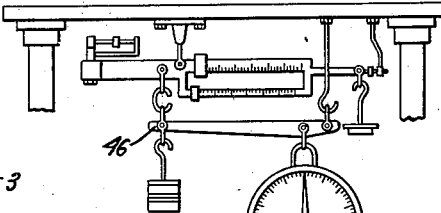
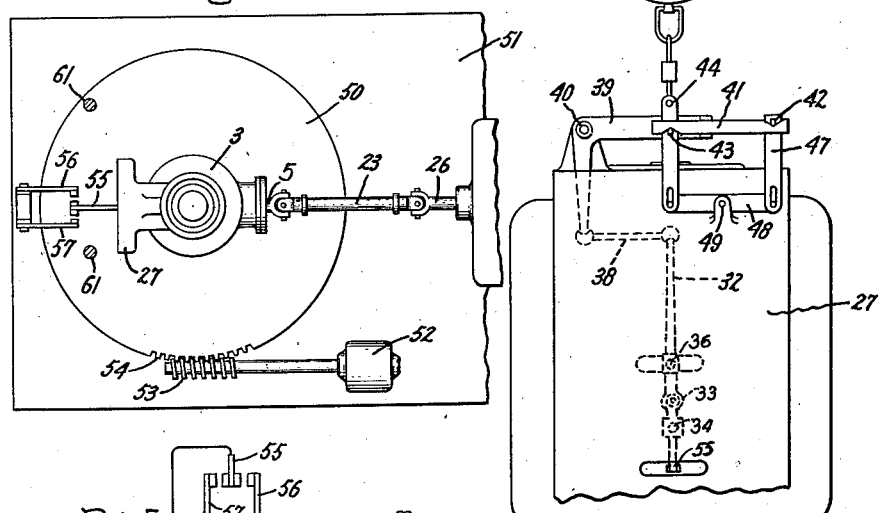
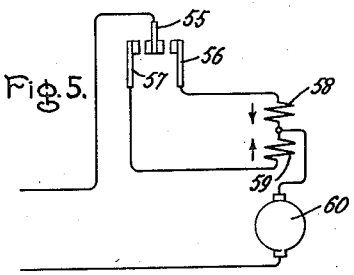
Inventor:
Harold M. Martin,
by Harry E. Dunham
His Attorney.

Patented Dec. 18, 1945

2,391,024

UNITED STATES PATENT OFFICE 2,391,024

DYNAMOMETER

Harold M. Martin, Schenectady, N. Y., assignor to General Electric Company, a corporation of New York Application May 27, 1944, Serial No. 537,592

7 Claims. (Cl. 73—136)

My invention relates to improvements in dynamometers and more particularly to a dynamometer adapted to measure or indicate the torque of a machine having a pair of oppositely rotating concentric shafts.

An object of my invention is to provide an improved dynamometer construction for measuring torque.

Another object of my invention is to provide an improved dynamometer for measuring the torque of a machine and for transmitting the power of the machine to a driven load.

A further object of my invention is to provide an improved dynamometer for measuring the torque of a machine having a pair of oppositely rotating concentric shafts.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view of an embodiment of my improved dynamometer construction, partly broken away and partly in section to illustrate the details of the torque-transmitting arrangement; Fig. 2 is an end elevational view of the dynamometer shown in Fig. 1, partly broken away to illustrate the arrangement of the torque-measuring device used in combination with the torque-transmitting mechanism shown in detail in Fig. 1 as viewed in the direction of the arrow A in Fig. 1; Fig. 3 is a partial sectional view taken along line 3—3 of Fig. 1; Fig. 4 is a partial plan view of the construction shown in Fig. 2 showing the supporting arrangement and equalizing motor and control; and Fig. 5 is a schematic diagram of the equalizing motor and control.

Referring to the drawing, I have illustrated a dynamometer particularly adapted to measure the torque of a machine having a pair of oppositely rotating concentric shafts which extend in a vertical direction. The arrangement could be used equally well for horizontally extending shafts with an obvious slight change in torque-transmitting linkage. The torque from a source of mechanical power provided with a pair of coaxial vertically extending shafts of a machine is adapted to be measured by coupling such shafts to vertically downwardly extending coaxial shafts 1 and 2. Shaft 1 is a hollow quill shaft, and shaft 2 is arranged to extend through shaft 1 such that both shafts may be coupled to the pair of shafts which provide the driving sources of mechanical power. Shaft 1 is rotatably supported in a bearing housing 3 by a pair of antifriction bearings 4, and power is transmitted from the shaft 1 to a load through a second shaft 5 which is rotatably supported substantially at right angles to shaft 1 by a pair of antifriction ball bearings 6 also mounted in the bearing housing 3. A power-transmitting connection is provided between the shafts 1 and 5 by a set of bevel gears 7 and 8 secured to the shafts 1 and 5, respectively. The shaft 2 is rotatably supported by a pair of antifriction bearings 9 and 10 mounted in a bearing housing 11 which is rotatably supported by bearings 12 and 13 coaxially with the shafts 1 and 2 within the bearing housing 3. Power may be transmitted from the shaft 2 to the load shaft 5 through a stub shaft 14 which is rotatably supported substantially at right angles to the shaft 2 by a pair of antifriction ball bearings 15 mounted in the bearing housing 11. A power-transmitting coupling is provided between the shafts 2 and 14 by a set of bevel gears 16 and 17 secured to the shafts 2 and 14, respectively. An end of the shaft 14 is connected by a universal joint 18 to a coupling sleeve 19 which slidably engages a complementary splined coupling member 20 secured to the end of another universal joint 21 connected to the end of the torque-transmitting loading shaft 5. With this arrangement, torque can be transmitted from the shaft 2 to the shaft 5 through the gears 16 and 17, the shaft 14, and the coupling elements 19 and 20. A load is adapted to be placed on the dynamometer through the shaft 5, and the outer end of this shaft is provided with a coupling which includes a universal joint 22 connected to a sliding splined coupling element 23 arranged in engagement with a complementary splined coupling element 24 connected by a universal joint 25 to a driven load shaft 26, such as the shaft of a loading generator or other kind of power absorbing device which provides a controllable variable load for the machine.

In order to measure the torque transmitted by the shaft 1, the bearing housing 3 is rotatably supported on a stationary frame 27 by an upper antifriction ball bearing 28 and a lower thrust ball bearing 29 arranged about upper and lower hubs 30 and 31, respectively, of the bearing housing, so that this bearing housing is free to rotate about a vertical axis coaxial with the axis of the shafts 1 and 2. With such an arrangement, substantially no torque, except that resulting from the friction in bearing 4, is transferred from the shaft 1 through its supporting bearings to the bearing housings 3 and 11.

A consideration of the forces exerted by the shaft 5 on the housing 3 indicates that the housing 3 must provide a resisting torque reaction equal and opposite to the torque transmitted through the shaft 5 from the shaft 1 in order to prevent rotation of the shaft 5 about the axis of the shaft 1 or the vertical axis of the bearing housing 3. Similarly, the bearing housing 11 must provide a resisting torque reaction equal and opposite to the torque transmitted through the shaft 14 from the shaft 2. The shaft 5 will not exert a turning torque on the bearing housing 3 due to its connection to the shaft 14, as the universal joint and sliding connection between these two shafts prevents the transmittal of forces tending to turn the outer bearing housing 3 about its vertical axis. The operation of each set of shafts is similar to the operation of this type dynamometer explained in my copending patent application, Serial No. 530,027, filed April 7, 1944, and assigned to the assignee of this application.

In order to measure the resisting torque reactions on the bearing housing 3 and 11, a suitable torque-transmitting linkage is adapted to connect these two bearing housings to a torque- or force-measuring device. Since the shafts 1 and 2 are adapted to rotate in opposite directions, a force-reversing link 32 is pivotally mounted on a boss 33 formed on the frame 27, and a ball and socket joint 34 connects this link through a vertically pivotable connection 35 to the outer bearing housing 3. A second ball and socket joint 36 is connected to the link 32 on the other side of its pivotal mounting through a vertically pivotable connection 37 to the bearing housing 11 which supports the shafts 2 and 14. Both of the ball and socket joints 34 and 36 may be disconnected from the link 32 such that the torque transmitted by either of the shafts 1 and 2 may be indicated independently of each other, or these shafts may be used singly if desired to measure the torque of a single shaft source of power. The upper end of the link 32 is connected through a link 38 to the lower end of a bell crank 39 which is pivotally supported at 40 on the frame 27 and which is fixedly connected through its other arm to a balance bar 41. This balance bar 41 is adapted to engage either of two knife edges 42 or 43 for transmitting forces to a link 44 coupled to a suitable spring balance scale 45 and to a balance mechanism 46 to measure or indicate the force exerted by the link 32 on the connecting mechanism. The linkage including the link 47 and lever 48 which is pivotally connected at 49 to the frame 27 is a conventional linkage which is used for transmitting forces in either direction from a dynamometer to a measuring device. Thus, the forces transmitted by the shafts 1 and 2 can be read either independently or cumulatively on the force-measuring balance scale 45 and balance mechanism 46.

In order to measure the torque transmitted by the shafts through the bearing housing 3, it is necessary that a slight angular movement be allowed to the bearing housing 3 and, therefore, to the shaft 5, to the universal connections provided by the universal joints 22 and 25, and to the sliding connection 24 for the transmission of torque to the driven load without undesirable stress resulting from the slight angular movement of the shaft 5 and the bearing housing 3. The measurement of large torques by this type dynamometer will produce relatively large displacements of the bearing housing and may result in the transmission of a restoring force to the bearing housing through the shaft 5. In order to minimize or substantially eliminate this restoring force which might introduce inaccuracies in the torque measurements, the entire torque reaction measuring mechanism and the gearing housings are mounted on a turntable 50 which is rotatably supported by any suitable bearing arrangement on a stationary platform base 51. An electric motor 52 is arranged to drive the turntable 50 by a worm gear 53 and a segmental gear 54 so as to maintain the shaft 5 substantially in alignment with the shaft 26 of the driven load. This motor 52 is adapted to be operated in either direction by reversal of its field exciting windings and is energized through a contactor 55 mounted on the link 32. This contactor 55 is adapted to contact one or the other of contacts 56 and 57 which are mounted on the stationary base and are connected in series with field exciting windings 58 and 59, respectively, for energizing one or the other of these field exciting windings to provide excitation in opposite directions to the armature 60 of the motor 52. This provides a reversing motor control responsive to the direction of rotational or angular displacement of the contactor 55 which operates in response to the rotational displacement of the bearing housing 3. Thus, rotational or angular displacement of the bearing housing 3 controls the energization of the motor 52 for rotating the turntable 50 in a direction opposite to the rotation of the bearing housing 3, and thereby provides for realignment of the shaft 5 and the driven load shaft, under which condition the contactor 55 opens the circuit of the motor 52. The torque reaction measuring mechanism is supported by posts 61 on the same turntable 50 as the bearing housing 3 and the frame 27, so that the rotation of the entire unit in no way affects the correct reading of the torque transmitted through the gear dynamometer and provides an accurate measurement or indication of the torque transmitted through the gears by the elimination of any restoring forces due to possible misalignment of shafts.

While I have illustrated and described a particular embodiment of my invention, modifications thereof will occur to those skilled in the art. I desire it to be understood therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A torque measuring device including a hollow first shaft adapted to be connected to a driving source of mechanical power, means for rotatably supporting said first shaft, a second shaft extending coaxial with and through said first shaft and adapted to be connected to a second driving source of mechanical power, means for rotatably supporting said second shaft, means for rotatably supporting said second shaft supporting means on said first shaft supporting means substantially coaxially with said first and second shafts, a third shaft adapted to be connected to a driven load, means including said first shaft supporting means for rotatably supporting said third shaft substantially at right angles to said first shaft, means for providing a driving connection between said first and third shafts, a fourth shaft arranged substantially coaxially with said third shaft, means including a universal joint for connecting said fourth shaft to said third shaft, means for providing a driving connection between said second and fourth shafts, means including said second shaft supporting means for rotatably supporting said fourth shaft substantially at right angles to said second shaft, means for rotatably supporting said first shaft supporting means substantially coaxially with said first and second shafts, means including a linkage for transmitting and measuring the resisting torque reaction of said third shaft on said first shaft supporting means, and means including said linkage for transmitting and measuring the resisting torque reaction of said fourth shaft on said second shaft supporting means and for cumulatively measuring the torque transmitted by said third and fourth shafts.

2. A torque measuring device including a hollow first shaft adapted to be connected to a driving source of mechanical power, means for rotatably supporting said first shaft, a second shaft extending coaxial with and through said first shaft and adapted to be connected to a second driving source of mechanical power, means for rotatably supporting said second shaft, means for rotatably supporting said second shaft supporting means substantially coaxially with said first and second shafts, a third shaft adapted to be connected to a driven load, means including said first shaft supporting means for rotatably supporting said third shaft substantially at right angles to said first shaft, means for providing a driving connection between said first and third shafts, a fourth shaft arranged substantially coaxially with said third shaft, means for connecting said fourth shaft to said third shaft, means for providing a driving connection between said second and fourth shafts, means including said second shaft supporting means for rotatably supporting said fourth shaft substantially at right angles to said second shaft, means for rotatably supporting said first shaft supporting means substantially coaxially with said first and second shafts, means including a linkage for transmitting and measuring the resisting torque reaction of said third shaft on said first shaft supporting means, and means including said linkage for transmitting and measuring the resisting torque reaction of said fourth shaft on said second shaft supporting means and for cumulatively measuring the torque transmitted by said third and fourth shafts.

3. A torque measuring device including a first shaft adapted to be connected to a driving source of mechanical power, means including a first housing for rotatably supporting said first shaft, a second shaft coaxial with said first shaft axis and adapted to be connected to a second driving source of mechanical power, means including a second housing for rotatably supporting said second shaft, means for rotatably supporting said second housing in said first housing substantially coaxially with the axis of said first and second shafts, a third shaft adapted to be connected to a driven load, means including said first housing for rotatably supporting said third shaft substantially at right angles to said first shaft, means for providing a driving connection between said first and third shafts, a fourth shaft arranged substantially coaxially with said third shaft, means for connecting said fourth shaft to said third shaft, means for providing a driving connection between said second and fourth shafts, means including said second housing for rotatably supporting said fourth shaft substantially at right angles to said second shaft, means for rotatably supporting said first housing substantially coaxially with the axis of said first and second shafts, means including a linkage for transmitting and measuring the torque reaction of said third shaft on said first housing about said axis, and means including said linkage for transmitting and measuring the torque reaction of said fourth shaft on said second housing about said axis and for cumulatively measuring the torque transmitted by said third and fourth shafts.

4. A torque measuring device including a hollow first shaft adapted to be connected to a driving source of mechanical power, means for rotatably supporting said first shaft, a second shaft extending coaxial with and through said first shaft and adapted to be connected to a second driving source of mechanical power, means for rotatably supporting said second shaft, means for rotatably supporting said second shaft supporting means on said first shaft supporting means substantially coaxially with said first and second shafts, a third shaft adapted to be connected to a driven load, means including said first shaft supporting means for rotatably supporting said third shaft substantially at right angles to said first shaft, means for providing a driving connection between said first and third shafts, a fourth shaft arranged substantially coaxially with said third shaft, means for providing a driving connection between said second and fourth shafts, means including a universal joint for connecting said fourth shaft to said third shaft, means including said second shaft supporting means for rotatably supporting said fourth shaft substantially at right angles to said second shaft, means for rotatably supporting said first shaft supporting means substantially coaxially with said first and second shafts, means including a linkage for transmitting and measuring the resisting torque reaction of said third shaft on said first shaft supporting means, means including said linkage for transmitting and measuring the resisting torque reaction of said fourth shaft on said second shaft supporting means and for cumulatively measuring the torque transmitted by said third and fourth shafts, and said linkage being constructed to be disconnected from said first and second housings for measuring either of said torque reactions separately.

5. A torque measuring device including a first shaft adapted to be connected to a driving source of mechanical power, means including a first housing for rotatably supporting said first shaft, a second shaft coaxial with said first shaft axis and adapted to be connected to a second driving source of mechanical power, means including a second housing for rotatably supporting said second shaft, means for rotatably supporting said second housing in said first housing substantially coaxially with the axis of said first and second shafts, a third shaft adapted to be connected to a driven load, means including said first housing for rotatably supporting said third shaft substantially at right angles to said first shaft, means for providing a driving connection between said first and third shafts, a fourth shaft arranged substantially coaxially with said third shaft, means for connecting said fourth shaft to said third shaft, means for providing a driving connection between said second and fourth shafts, means including said second housing for rotatably supporting said fourth shaft substantially at right angles to said second shaft, means for rotatably supporting said first housing substantially coaxially with the axis of said first and second shafts, means including a linkage for transmitting and measuring the torque reaction of said third shaft on said first housing about said axis, means including said linkage for transmitting and measuring the torque reaction of said fourth shaft on said second housing about said axis and for cumulatively measuring the torque transmitted by said third and fourth shafts, and said linkage being constructed to be disconnected from said first and second housings for measuring either of said torque reactions separately.

6. A torque measuring device including a hollow first shaft adapted to be connected to a driving source of mechanical power, means including a first housing for rotatably supporting said first shaft, a second shaft extending coaxial with and through said first shaft and adapted to be connected to a second driving source of mechanical power, means including a second housing for rotatably supporting said second shaft, means for rotatably supporting said second housing on said first housing substantially coaxially with said first and second shafts, a third shaft adapted to be connected to a driven load, means including said first housing for rotatably supporting said third shaft substantially at right angles to said first shaft, means for providing a driving connection between said first and third shafts, a fourth shaft arranged substantially coaxially with said third shaft, means including an axially extensible universal joint for connecting said fourth shaft to said third shaft, means for providing a driving connection between said second and fourth shafts, means including said second housing for rotatably supporting said fourth shaft substantially at right angles to said second shaft, means for rotatably supporting said first housing substantially coaxially with said first and second shafts, means including a linkage for transmitting and measuring the resisting torque reaction of said third shaft on said first housing, means including said linkage for transmitting and measuring the resisting torque reaction of said fourth shaft on said second housing and for cumulatively measuring the torque transmitted by said third and fourth shafts, and said linkage constructed to be disconnected from said first and second housings for measuring either of said torque reactions separately.

7. A torque measuring device including a first shaft adapted to be connected to a driving source of mechanical power, means including a first housing for rotatably supporting said first shaft, a second shaft coaxial with said first shaft and adapted to be connected to a second driving source of mechanical power, means including a second housing for rotatably supporting said second shaft, means for rotatably supporting said second housing in said first housing substantially coaxially with said first and second shafts, a third shaft adapted to be connected to a driven load, means including said first housing for rotatably supporting said third shaft substantially at right angles to said first shaft, means for providing a driving connection between said first and third shafts, a fourth shaft arranged substantially coaxially with said third shaft, means for providing a driving connection between said second and fourth shafts, means including a universal joint for connecting said fourth shaft to said third shaft, means including said second housing for rotatably supporting said fourth shaft substantially at right angles to said second shaft, means for rotatably supporting said first housing substantially coaxially with said first and second shafts, means including a linkage for transmitting and measuring the resisting torque reaction of said third shaft on said first housing, means including said linkage for transmitting and measuring the resisting torque reaction of said fourth shaft on said second housing for cumulatively measuring the torque transmitted by said third and fourth shafts, said linkage being constructed to be disconnected from said first and second housings for measuring either of said torque reactions separately, means for rotatably supporting said torque reaction measuring means and said housings, and means for rotating said rotatable supporting means for maintaining said third shaft substantially in alignment with said driven load.

HAROLD M. MARTIN.